B. C. THRONSON.
WIND SHIELD CLEANER FOR AUTOMOBILES.
APPLICATION FILED FEB. 17, 1917.
1,235,257.
Patented July 31, 1917.
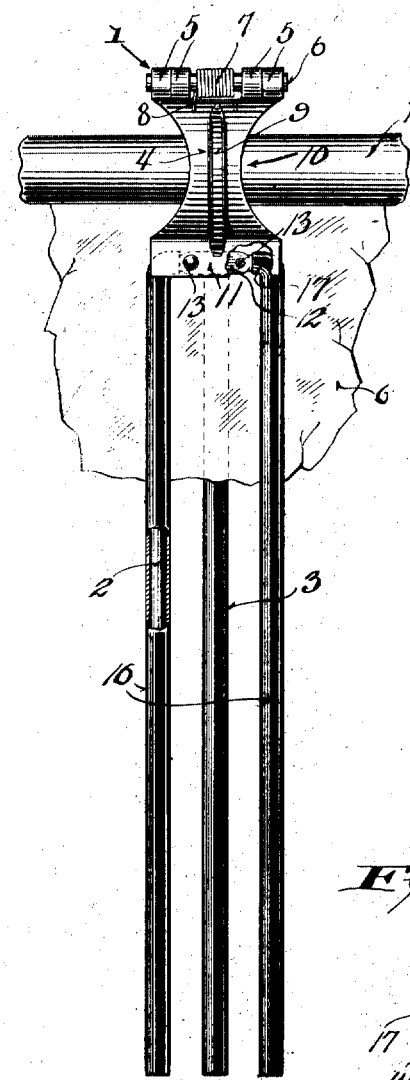
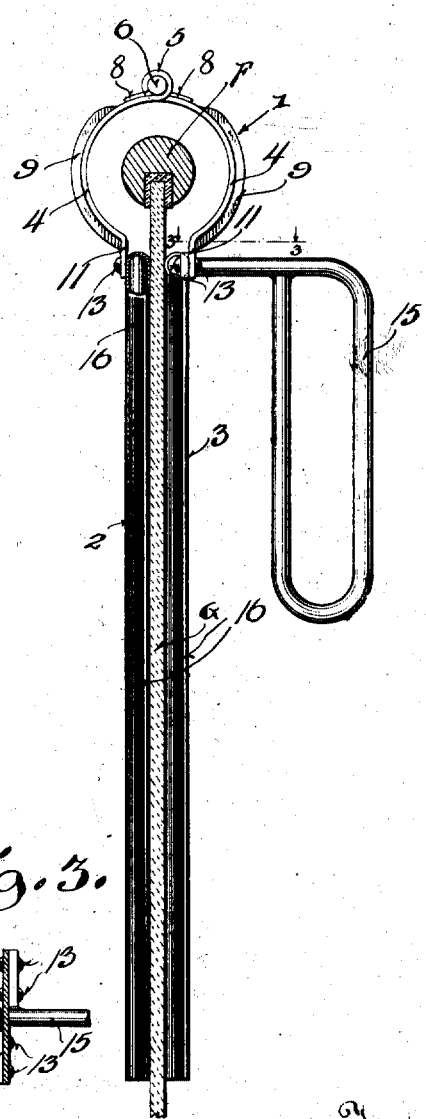
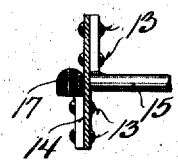

UNITED STATES PATENT OFFICE.

BARTHOLOMEW C. THRONSON, OF RACINE, WISCONSIN.

WIND-SHIELD CLEANER FOR AUTOMOBILES.

1,235,257.   Specification of Letters Patent.   Patented July 31, 1917.

Application filed February 17, 1917. Serial No. 149,187.

*To all whom it may concern:*

Be it known that I, BARTHOLOMEW C. THRONSON, a citizen of the United States, and resident of Racine, in the county of Racine and State of Wisconsin, have invented certain new and useful Improvements in Wind-Shield Cleaners for Automobiles; and I do hereby declare that the following is a full, clear, and exact description thereof.

This invention relates broadly to attachments for automobiles, more particularly to cleaners for the wind shields thereof.

The principal object of the invention is to provide a simply constructed cleaner by means of which both sides of a wind shield may be wiped free from moisture whenever the same collects thereon from any cause.

An additional object is to provide a novel means for holding a flexible covering on the wiper supports.

With these general objects in view the invention resides in the novel arrangement of parts which will be hereinafter more particularly described and claimed and shown in the drawings wherein:—

Figure 1 represents a front elevation of my invention mounted upon a portion of an automobile wind shield, parts of the device being broken away and in section.

Fig. 2 is a vertical transverse sectional view through the wind shield showing the device in edge view.

Fig. 3 is a detail horizontal section on the line 3—3 of Fig. 2.

In the accompanying drawing the invention is shown in its preferred embodiment and from the several figures it will be noted that it consists broadly of a clip 1 and two sets of wiper supports 2 and 3, the former being disposed around the top part of the wind shield frame F, while the latter are disposed on each side of the glass G thereof. The supports 2 and 3 are preferably of such a length that they will clean practically the whole upper portion of the wind shield.

The clip 1, which is somewhat U-shaped, consists of a pair of oppositely curved plates 4, one edge of each of which is provided with a number of alined eyes 5 which are adapted to receive a pintle 6, thereby hinging said plates together. It is preferable that the free ends of the plates be caused to move toward each other to force the above mentioned wiper arms into engagement with the sides of the wind shield, therefore a coil spring 7 is disposed around the intermediate portion of the pintle 6. Opposite ends 8 of this spring engage the two plates 4 in such a manner that when the free ends of the plates are moved away from each other the tension of the spring will tend to move the plates toward each other when released. These plates 4 may be made of very light sheet metal in which case reinforcing ribs 9 are provided thereon for strengthening the same. This permits the opposite side edges to be cut away as shown at 10 without greatly weakening the same.

The ends of the plates opposite their hinged connection with each other are bent laterally to form attaching flanges 11 to which the wiper supports 2 and 3 are secured. Any number of the latter may be attached to each of the plates, and in the present instance two are used for cleaning the outside of the wind shield, while only one is necessary for the inside. The supports 2 are disposed on the outside of the wind shield and are formed by bending a rod of appropriate length into substantially U-shape, the arms of which form the wiper supports while the cross bar 12 is flattened and adapted to be secured to one of the attaching flanges 11 by suitable fastening elements such as the rivets 13.

The single wiper support 3 is also formed from a rod, the upper end of which is bent laterally and flattened as shown at 14 so that it may be readily attached to the attaching flange 11 of the inner plate 4. A handle 15 of suitable shape is also attached to this flange 11.

Since the wiper supports 2 and 3 are necessarily formed of metal to provide the necessary strength for the device, it is desirable that they be covered with some suitable form of flexible material to prevent injury to the glass of the wind shield. In the present instance tubular rubber sheathing is slipped on the supports as clearly shown in Fig. 1. When this material is moved across the surface of the glass of the wind shield it will effectively remove all moisture which clings thereto. In order to very effectively, yet simply secure the sheathing 16 to the metal wiper supports, the same is applied before the latter are attached to the flanges 11 and the upper end of each portion of the covering is slipped around the laterally bent upper ends of the supports as shown at 17.

Now, when the ends of the supports are secured to the attaching plates 11 by the fastening elements 13 these upper portions of the sheathing members will be clamped between said flanges 11 and the supports 2 and 3. By this simple arrangement the sheathing will be prevented from sliding from the supports 2 and 3 and also will be prevented from rotating or moving therearound. Should it be necessary to ever apply new sheathing to the supports, the latter may be disengaged from the attaching flanges 11, and the old covering removed. If it is necessary to frequently change the wiper members, bolts and nuts may be substituted for the rivets 13.

It is seen that while this arrangement of parts produces a very simply constructed cleaning device, the same would be extremely efficient in operation and since it is formed of a very few number of parts may be inexpensively manufactured.

Various minor changes may be made in the several parts of the device, for instance in the length of the wiper supports, without departing from the principles of the invention as outlined in the following claims.

I claim:—

1. In a cleaner of the class described a substantially U-shaped clip, the free ends of the arms of which are movable toward each other, a pair of wiper supports formed of a rod bent into U-shape, the same being secured to one arm of the clip by the cross bar connecting said supports, and an additional wiper support secured to the other arm of the clip.

2. In a cleaner of the class described, a pair of oppositely curved plates hinged together along one end, a spring forcing the free ends of said plates toward each other, said free end portions being bent laterally and disposed in parallel relation to provide attaching portions, a wiper support fixed to the attaching portion of each of said plates, and a handle for operating said cleaner.

In testimony that I claim the foregoing I have hereunto set my hand at Racine, in the county of Racine and State of Wisconsin, in the presence of two witnesses.

BARTHOLOMEW C. THRONSON.

Witnesses:
 DAN STROUF,
 LOUIS THRONSON.